(12) United States Patent
Blank et al.

(10) Patent No.: US 6,286,862 B1
(45) Date of Patent: Sep. 11, 2001

(54) METHOD OF CONTROLLING THE INFLATION OF AN AIRBAG AND AIRBAG ACCIDENT PROTECTION DEVICE

(75) Inventors: Thomas Blank, Karlsruhe; Christian Zelger, Regensburg; Günter Heitzer, Pfatter, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/538,794

(22) Filed: Mar. 30, 2000

Related U.S. Application Data

(63) Continuation of application No. PCT/DE98/02630, filed on Sep. 7, 1998.

(30) Foreign Application Priority Data

Sep. 30, 1997 (DE) .............................................. 197 43 304

(51) Int. Cl.⁷ .................................................. B60R 21/32
(52) U.S. Cl. .......................... 280/735; 280/236; 280/242
(58) Field of Search ..................................... 280/734, 735, 280/736, 742

(56) References Cited

U.S. PATENT DOCUMENTS

| 4,026,580 | * | 5/1977 | Wulf et al. | 280/736 |
| 5,122,954 | | 6/1992 | Okano . | |
| 5,366,242 | * | 11/1994 | Faigle et al. | 280/736 |
| 5,411,289 | | 5/1995 | Smith et al. . | |
| 5,460,405 | | 10/1995 | Faigle et al. . | |
| 5,613,702 | | 3/1997 | Goetz et al. . | |
| 5,664,802 | * | 9/1997 | Harris et al. | 280/736 |
| 5,678,855 | * | 10/1997 | Byon | 280/736 |

FOREIGN PATENT DOCUMENTS

| 2 420 411 | 11/1974 | (DE) . |
| 40 00 309 A1 | 7/1991 | (DE) . |
| 195 27 554 A1 | 4/1996 | (DE) . |
| 195 26 334 A1 | 1/1997 | (DE) . |
| 195 32 628 A1 | 3/1997 | (DE) . |
| 195 41 796 A1 | 5/1997 | (DE) . |
| 0 402 622 A1 | 12/1990 | (EP) . |
| 0 570 347 A2 | 11/1993 | (EP) . |
| 0 790 157 A2 | 8/1997 | (EP) . |
| 2 218 698 A | 11/1989 | (GB) . |

* cited by examiner

Primary Examiner—Eric Culbreth
(74) Attorney, Agent, or Firm—Herbert L. Lerner; Laurence A. Greenberg; Werner H. Stemer

(57) ABSTRACT

A method of controlling inflation of an airbag in a motor-vehicle accident protection device, includes activating a gas generator in response to a firing signal for inflating the airbag. A temperature and/or a pressure of the gas generator is measured and the inflation takes place in such a way that a desired pressure profile in the airbag is achieved.

9 Claims, 3 Drawing Sheets

METHOD OF CONTROLLING THE INFLATION OF AN AIRBAG AND AIRBAG ACCIDENT PROTECTION DEVICE

CROSS-REFERENCE TO RELATED APPLICATION

This application is a continuation of copending International Application No. PCT/DE98/02630, filed Sep. 7, 1998, which designated the United States.

BACKGROUND OF THE INVENTION

FIELD OF THE INVENTION

The invention relates to a method of controlling inflation of an airbag in a motor-vehicle accident protection device, in which a gas generator is activated in response to a firing signal and inflates the airbag in dependence on operating conditions, a temperature of the gas generator is measured at least indirectly and the inflation takes place in dependence on the temperature. The invention also relates to a motor-vehicle airbag accident protection device, including an airbag, and an inflating device for the airbag having a gas generator, a firing device for activating the gas generator, a control device for controlling the operation of the inflating device in dependence on temperature, and a temperature-measuring device with a measuring sensor for at least indirectly sensing the temperature of the gas generator to generate a firing signal for the firing device.

Airbag protection devices or so-called airbags are becoming increasingly popular in motor vehicles. The mass flow of gas necessary for filling the airbag is currently usually produced by burning a solid fuel, for example sodium azide, wherein the fuel is ignited by a primer or detonating composition. Alternatively, gas generators which contain a solid propellant charge within a gas chamber are used, in which gas is stored in the gas chamber under high pressure (hybrid generators). When the propellant charge is ignited, which may likewise take place electrically through the use of a primer, a hole is produced at a predetermined location on the gas chamber and the airbag is inflated through that hole.

The pressure level of the airbag is a decisive variable for the restraining effect. If the pressure level is too low, there is the risk that, in spite of the airbag, a vehicle occupant may hit a steering wheel, for example, and suffer injuries. If, however, the pressure level is too high, that may lead to injuries to small people, children or infants. The pressure level which the airbag reaches is consequently a critical variable.

In addition, it has been found that, at low temperatures, in accidents with great deceleration and in the case of large, heavy vehicle occupants not wearing seat belts, there is the risk of the airbag pressure not being adequate to prevent the occupant from crashing through onto parts of the dashboard. At very high temperatures and in the case of small, lightweight vehicle occupants not wearing seat belts, on the other hand, there is the risk of the occupant being injured by the airbag during its deployment.

European Patent Application EP 0 790 157A2, corresponding to U.S. Pat. No. 5,664,802, discloses a motor-vehicle airbag accident protection device including an airbag, an inflating device for the airbag with a gas generator, a firing device for activating the gas generator and a control device for generating a firing signal for the firing device. A temperature-measuring device with a measuring sensor for sensing a temperature of the gas generator is also provided.

SUMMARY OF THE INVENTION

It is accordingly an object of the invention to provide a method of controlling inflation of an airbag and an airbag accident prevention device, which overcome the herein-aforementioned disadvantages of the heretofore-known methods and devices of this general type and with which the risk of injury is further reduced.

With the foregoing and other objects in view there is provided, in accordance with the invention, a method of controlling inflation of an airbag in a motor-vehicle accident protection device, which comprises sensing and determining a temperature of a gas generator at least indirectly with an integrated circuit; transmitting the determined temperature as a coded signal to a control unit; supplying a firing signal with the control unit; activating the gas generator in response to the firing signal; and inflating an airbag with the gas generator in dependence on the temperature.

With the objects of the invention in view, there is also provided a motor-vehicle airbag accident protection device, comprising an airbag; and an inflating device for said airbag, said inflating device including a gas generator, a firing device for activating said gas generator, a control device for controlling operation of said inflating device in dependence on temperature, a temperature-measuring device with a measuring sensor for at least indirectly sensing a temperature of said gas generator to generate a firing signal for said firing device, an integrated circuit associated with said measuring sensor for sensing the temperature of said gas generator, and a data line connected between said integrated circuit and said control device.

With the method and device according to the invention, a temperature of the gas generator which has a decisive influence on the gas development during burning of the fuel is measured and taken into account during inflation of the airbag. If the gas generator is suitably disposed, the temperature may be the ambient temperature. If the gas generator is disposed at a location of the vehicle where experience shows that the temperature is significantly different from the ambient temperature, the temperature of the gas generator directly, and if possible the temperature of the fuel, must be measured.

There are numerous possibilities for controlling the inflation in dependence on the temperature. For example, at low temperature the ignition may be triggered with less delay after an accident. Furthermore, the widest variety of airbags are used at different locations of the motor vehicle. If such airbags, overall, have a porous structure or are provided with outflow openings, the pressure produced in them depends on the mass flow of the gas flowing in. If this mass flow increases at high temperature, a temperature-independent pressure can nevertheless be achieved, for example by an inflow opening in the airbag being made smaller with increasing temperature, and vice versa.

The airbag may be inflated by a plurality of gas generators in series, so that a predetermined pressure profile which corresponds to a desired profile can be achieved by temperature-dependent and/or pressure-dependent choice of the firing of the individual gas generators.

In order to achieve a predetermined pressure in the airbag it is advantageous to activate a following gas generator at an increasingly earlier time with decreasing temperature, because of the slower gas generation with decreasing temperature, so that the temperature dependence of the gas flow is tendentially counteracted.

A reaction accelerator may be used both in temperature-dependent control and in pressure-dependent control of the operation of the gas generator.

There are numerous and varied possibilities for intervention in the airbag accident protection device by which a temperature dependence of the airbag pressure established on the basis of the temperature dependence of the burning of the gas-generating fuel and/or the gas pressure in a closed container can be counteracted. For example, outflow openings from the gas generator may be made larger with decreasing temperature or outflow openings from the airbag may be made smaller with decreasing temperature and/or the instants at which the individual gas generators are fired may be varied if a plurality of gas generators are used for an airbag.

Other features which are considered as characteristic for the invention are set forth in the appended claims.

Although the invention is illustrated and described herein as embodied in a method of controlling the inflation of an airbag and an airbag accident protection device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
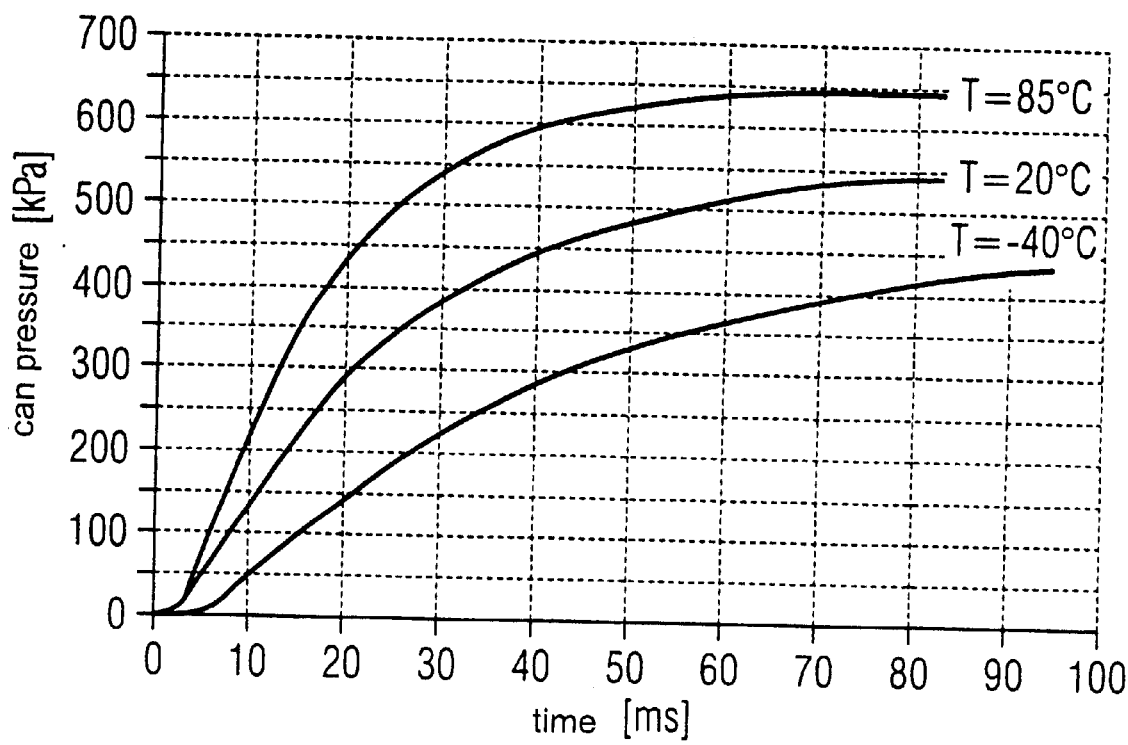
FIG. 1 is a diagram illustrating a temperature dependence of a mass flow of gas.

Referring now to the figures of the drawings in detail and first, particularly, to FIG. 1 thereof, there is seen a diagram which represents a pressure build-up within a gas generator, for example a chamber, within which solid fuel burns and from which gas being produced escapes into an airbag, in dependence on temperature. Given an appropriately large overflow opening between the gas generator and the airbag, this pressure is essentially equal to the pressure prevailing in the airbag. It is self-evident that, because of the gas flowing out of the airbag, this pressure is only maintained if a corresponding amount of gas is generated.

A primer or detonating composition in the gas generator is triggered in each case at an instant zero. As can be seen, at an initial temperature of 85° C. of the solid fuel or the primer, a pressure of approximately 650 kPa builds up within 80 ms. A pressure of approximately 500 kPa builds up with a slower rate of increase within 80 ms at a temperature of 20° C. There is only a pressure of a good 400 kPa which, however, slowly increases further, at −40° C., after 80 ms. This strong temperature dependence of the gas pressure build up is, as explained at the outset, disadvantageous and leads to limited effectiveness of the airbag in the event of an accident. In the case of multi-stage airbag modules, having an airbag which is inflated by a plurality of gas generators, propellant charges assigned to the individual gas generators are ignited at staggered times, as a result of which it is possible to make the mass flow of gas, and consequently the pressure in the airbag, adjustable. It is correspondingly possible to counteract the temperature dependence of the pressure level by measuring the temperature.

Figure 2:
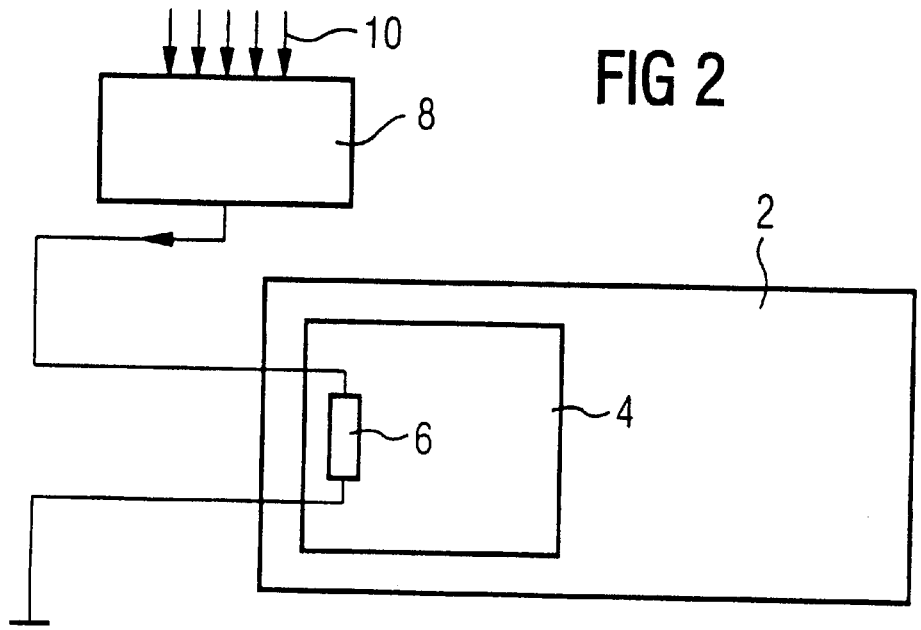
FIGS. 2 and 3 are block diagrams of devices for measuring a temperature of a primer and a propellant charge.

FIG. 2 shows a first embodiment of a device for measuring the temperature of a primer, and consequently of a propellant charge, within the gas generator of an airbag module.

According to FIG. 2, a primer 4 is disposed within a propellant charge 2. The primer 4 has an electrical equivalent circuit which is represented as a resistor 6 and is connected to ground and to an output of a control device 8.

The function of the configuration described above is known per se and is therefore not explained in detail herein.

Inputs 10 of the control device 8 are fed signals by sensors including, in particular, an acceleration sensor. On the basis of those signals, a microprocessor contained in the control device 8 calculates whether or not a triggering pulse of a predetermined energy content is sent to the primer 4. On the basis of that pulse the primer 4 ignites the propellant charge 2 and a non-illustrated airbag connected to a container with the propellant charge is inflated.

The value of the resistance of the primer 4, which by nature is temperature-dependent, is measured on a routine basis. For this purpose, under the control of the microprocessor of the control device 8, a predetermined constant voltage $U_{Mess}$ is applied to the primer 4 and a current flow $I_{Mess}$ is measured. The resistance of the primer can be determined in this way on a routine basis, so that the temperature of the primer 4, and consequently of the propellant charge 2, can be determined.

One advantage of the device described above is that the hardware referred to is present in customary airbag devices. A diagnosis of the primer 4 with regard to serviceability, non-serviceability or primer burned-up or fired takes place on a routine basis through a line between the control device 8 and the primer 4. The diagnostic mode is extended by determining the temperature of the primer 4 or of the propellant charge 2 through software implemented in the control device 4.

Figure 3:
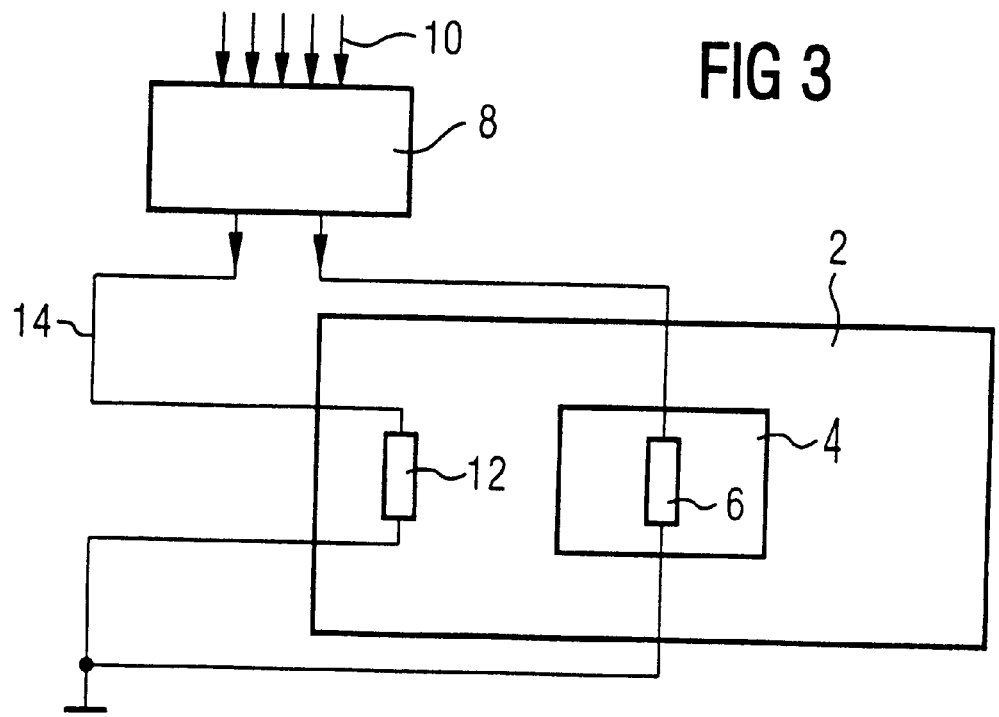

FIG. 3 shows a further embodiment of a device for determining the temperature of the propellant charge. The same reference numerals as in FIG. 2 are used for components performing the same or a similar function. The embodiment of FIG. 3 differs from that of FIG. 2 in that a separate temperature sensor 12 is integrated in the propellant charge 2 and is connected to a further output of the control device 8 through a temperature measuring line 14. The temperature sensor 12 may, for example, be a thermocouple, i.e. a resistor with strong temperature dependence.

The measuring principle is similar to that of FIG. 2. When there is a constant voltage $U_{Mess}$ at the temperature sensor 12, the current $I_{Mess}$ flowing through the temperature sensor 12 depends on the temperature of the latter, so that the temperature in the control device 8 can be calculated. The temperature measurement with the device according to FIG. 3 is more accurate than that of FIG. 2.

Figure 4:
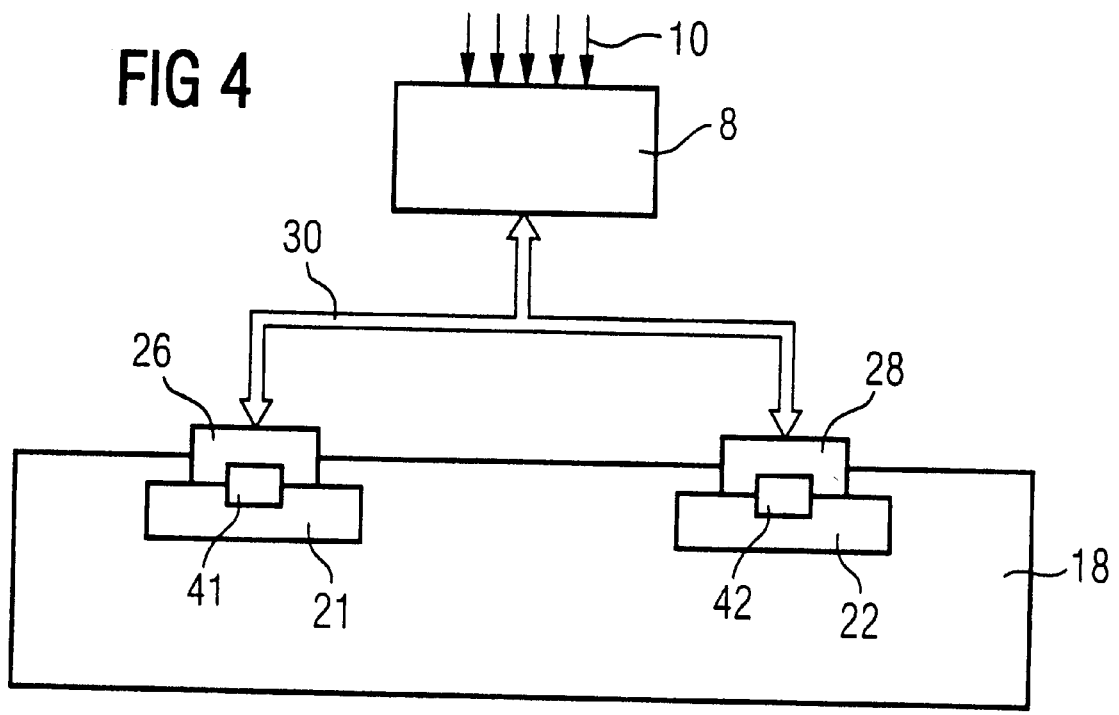
FIG. 4 is a block diagram of an embodiment of a device according to the invention.

FIG. 4 shows a further embodiment of a control device 8 with connected primers and propellant charges:

Two propellant charges 21 and 22 are disposed in an airbag 18 and primers 41 and 42 are respectively assigned to the propellant charges. Each primer 41 and 42 contains a respective integrated circuit (ASIC) 26 and 28 which is connected to the control device 8 through a data line 30. In the event of the control device 8 being triggered, coded information: "fire primer 41 and/or 42" is sent through the data line 30 which is configured as a communication bus, to the circuits 26 and 28. Then, a melting resistor, which is usually constructed as an integrated resistance path in the integrated circuit 26 or 28, is supplied with sufficient energy from a non-illustrated energy supply of the primer, for example a capacitor.

The information: primer okay or not okay, primer has fired (has burned up) and resistance of the primer, that is the resistance value of the resistance integrated as the firing resistance on the integrated circuit 26 or 28, is sent from the circuits 26 and 28 to the control unit 8. In this case, the temperature of the primer can be calculated from the resistance of the primer in the control unit 8. A time sequence of the firing of the primers 41 and 42 can be controlled by using the temperature information in such a way that a predetermined pressure profile which is largely independent of the initial temperature is achieved in the airbag 18.

As an alternative or in addition to the measurement of the resistance in the integrated circuit 26 and 28 described above, each circuit 26 and 28 may have a differently constructed sensor for determining the temperature of the primer, which at the same time is essentially the temperature of the associated propellant charge or temperature of the airbag 18. A different resistance path of the integrated circuit 26 or 28 may also be used as the firing resistance path for the temperature determination. A diode in the integrated circuit 26 or 28 is preferably used for the temperature measurement, with the diode current being measured as the temperature-dependent variable. The temperature being determined is transmitted as a coded signal to the control unit 8.

Figure 5:
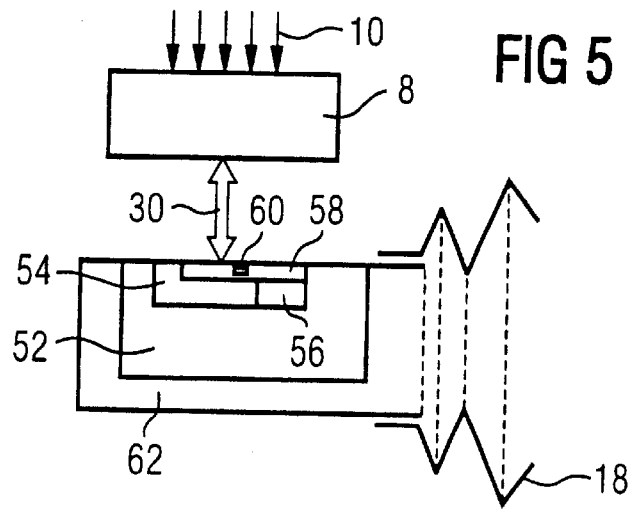
FIG. 5 is a block diagram of a further embodiment of a device according to the invention.

FIG. 5 shows an embodiment in which a propellant charge 52 is ignited by a primer 54 and there is additionally provided a reaction accelerator 56, which can be released, for example, by its own non-illustrated primer and if need be boosts the burn-up rate of the propellant charge 52. An integrated circuit 58, for triggering the primer 54 and the reaction accelerator 56, is connected to the control device 8 through the data line 30. The integrated circuit 58 has a pressure sensor 60, which measures the gas pressure within a housing 62 to which the airbag 18 is connected. The pressure sensor 60 may in this case be disposed in an outflow duct or downstream of the outflow duct of the airbag.

Figure 6:
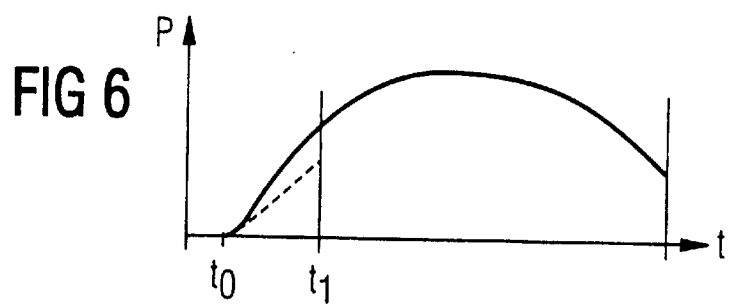
FIG. 6 is a diagram illustrating a profile of a gas pressure to explain a mode of operation of the embodiment according to FIG. 5.

The function of the embodiment according to FIG. 5 is explained with reference to FIG. 6. The solid curve is intended to represent a desired pressure profile if the primer 54 is fired at an instant $t_0$. If, in the actual event of firing, an actual pressure profile according to the broken line is achieved, the reaction accelerator 56 is activated at an instant $t_1$, so that the pressure increases and the desired pressure profile is achieved.

It is self-evident that the embodiment according to FIG. 5 may likewise have a multi-stage structure, like that of FIG. 4.

Figure 7:
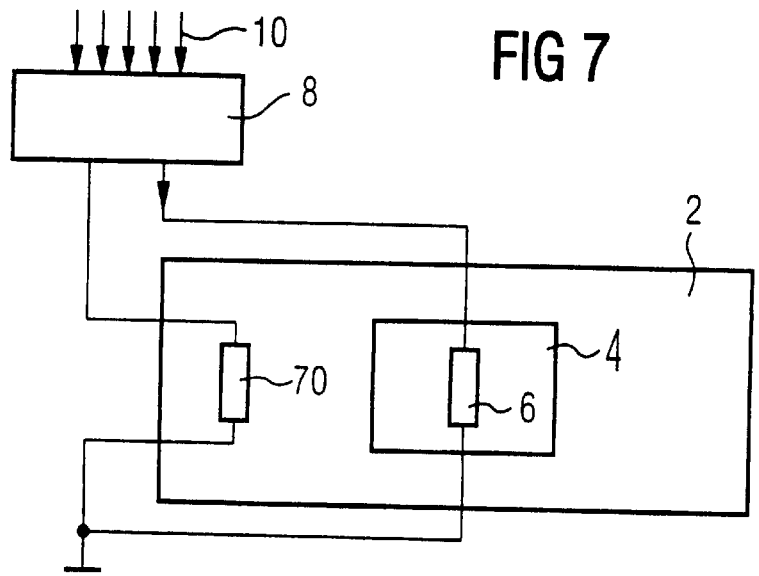
FIG. 7 is a block diagram showing details of a further embodiment of an airbag accident protection device.

FIG. 7 shows an embodiment which largely corresponds to that of FIG. 3, with the difference that the temperature sensor 12 of FIG. 3 is replaced by a temperature-control element 70, through which the temperature of the propellant charge 2 can be kept at a predetermined value, under the control of the control device 8. In this case, the temperature-control element 70 may be formed by a heating resistor or be constructed as a Peltier element which can be used for heating or cooling. It is self-evident that the temperature-control element 70, through which the temperature measurement takes place at the same time, is situated at a location where the temperature is decisive for the gas development.

It is generally noted, with regard to the embodiments described above, that elements 2, 21, 22, 52 may be referred to as gas generators and elements 4, 41, 42, 54 may be referred to as firing devices.

We claim:

1. A method of controlling inflation of an airbag in a motor-vehicle accident protection device, which comprises:

sensing and determining a temperature of a gas generator at least indirectly with an integrated circuit;

transmitting the determined temperature as a coded signal to a control unit;

supplying a firing signal with the control unit;

activating the gas generator in response to the firing signal; and inflating an airbag with the gas generator in dependence on the temperature.

2. A motor-vehicle airbag accident protection device, comprising:

an airbag; and an inflating device for said airbag, said inflating device including:
a gas generator,
a firing device for activating said gas generator,
a control device for controlling operation of said inflating device in dependence on temperature,
a temperature-measuring device with a measuring sensor for at least indirectly sensing a temperature of said gas generator to generate a firing signal for said firing device,
an integrated circuit associated with said measuring sensor for sensing the temperature of said gas generator, and
a data line connected between said integrated circuit and said control device.

3. The device according to claim 2, wherein said integrated circuit is disposed on said firing device.

4. The device according to claim 2, including a device for introducing a reaction accelerator into said gas generator at a low temperature.

5. The device according to claim 2, including a device for introducing a reaction accelerator into said gas generator at a low temperature below a desired value.

6. The device according to claim 2, including a device for introducing a reaction accelerator into said gas generator at a temperature below a desired value.

7. The device according to claim 2, wherein said integrated circuit has a firing resistance path, and said measuring sensor is said firing resistance path.

8. The device according to claim 2, wherein said integrated circuit has a firing resistance path and another resistance path, and said measuring sensor is said other resistance path.

9. The device according to claim 2, wherein said integrated circuit has a diode, and said measuring sensor is said diode.

* * * * *